Oct. 17, 1939.  H. D. GALVIN  2,176,811
APPARATUS FOR COOKING OR HEATING FOODSTUFFS
Filed Dec. 15, 1937  8 Sheets-Sheet 1

Oct. 17, 1939.      H. D. GALVIN      2,176,811
APPARATUS FOR COOKING OR HEATING FOODSTUFFS
Filed Dec. 15, 1937      8 Sheets-Sheet 5

Patented Oct. 17, 1939

2,176,811

UNITED STATES PATENT OFFICE 2,176,811

APPARATUS FOR COOKING OR HEATING FOODSTUFFS

Herbert Dan Galvin, New Malden, England, assignor to L. C. Engineering Supplies Limited, New Malden, England Application December 15, 1937, Serial No. 179,990
In Great Britain January 1, 1937

7 Claims. (Cl. 126—272)

This invention relates to apparatus primarily intended for the heating or cooking of foodstuffs (whether in tins, glass jars or other containers).

In the canning industry in particular the tendency has been to employ larger retorts having an increased capacity so as to obtain a large output consistent with the time taken in the cooking or other operation but on the other hand this sometimes leads to difficulties owing to uncertainty in the behaviour of the cans (possibly due to a faulty manufacture or filling) and the spoiling of the whole batch of cans being treated at the time, or at the best the necessity for shutting down the whole plant while the trouble is remedied.

The object of the present invention is to devise simple and efficient apparatus which is adaptable for the accommodation of cans or the like of any size or shape and is capable of giving a large output and possesses few moving parts liable to give rise to trouble while at the same time the construction is such that in the event of trouble arising in one part of the apparatus that part may be isolated without in any way interfering with the operation of the rest of the plant.

The invention consists in cooking or heating apparatus comprising a plurality of retorts or cooking or treating chambers movable so that they pass in succession loading stations at which they may be charged with cans or other articles to be treated and unloading stations at which the cans or the like may be discharged therefrom.

The invention also consists in cooking or like apparatus according to the preceding paragraph having means for supplying automatically to the retorts or chambers as and when needed steam or other cooking or heating medium, air or other gas under pressure to displace the heating medium, water or other cooling medium and/or any other desired fluid medium depending upon the character of the operation to be performed.

The invention also consists in apparatus according to the preceding paragraph having means for varying the amount of fluids supplied.

The invention further consists in apparatus according to the penultimate paragraph having means for varying the cycle in which and/or the times at which the fluids are supplied.

Further features of the invention will be apparent from the description given hereafter.

In the accompanying drawings:

Figure 8 is a plan view of Figure 7a;

In carrying the invention into effect in one convenient manner as illustrated in the drawings there are provided a plurality of tubular retorts 1, each of which may be of any desired length, but the diamter of each of which is usually only sufficient to enable the retort to take a plurality of cans 104 in alignment and sufficient fluid media to effect the cooking and other operations.

Figures 1, 5, 6:
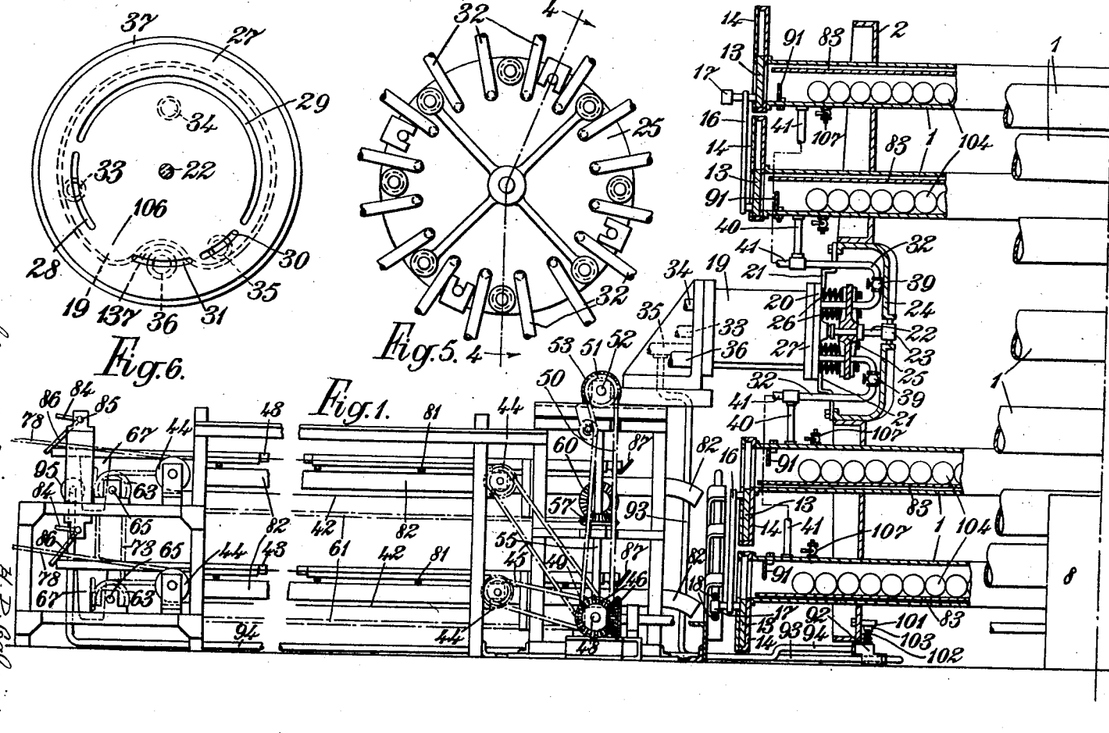
Figure 1 is a side elevation, partly in section, of one form of apparatus in accordance with the invention, and showing that part of the apparatus where the cans or the like are loaded upon rams for introduction into the retorts.
Figure 5 is an end view of Figure 4 looking in the direction of the arrow A.
Figure 6 is a section on the line 6—6 of Figure 4.
Figure 1A:
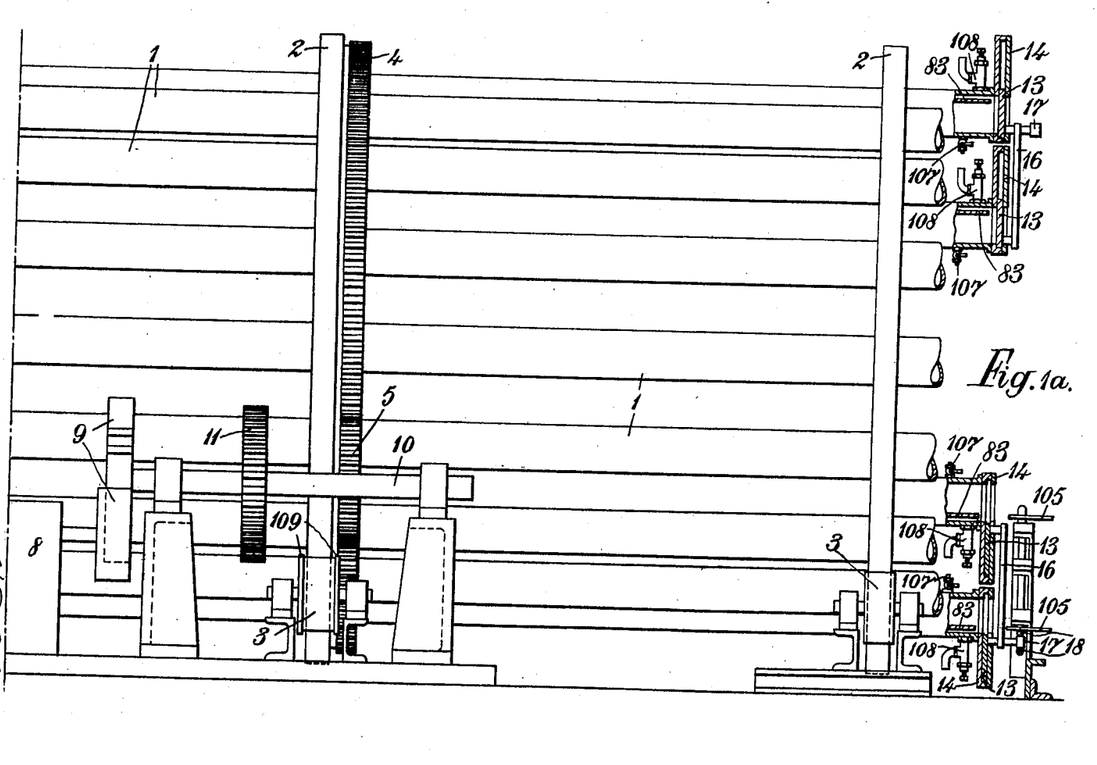
Figure 1a is a similar view of the discharge end of the apparatus.
Figures 2, 13:
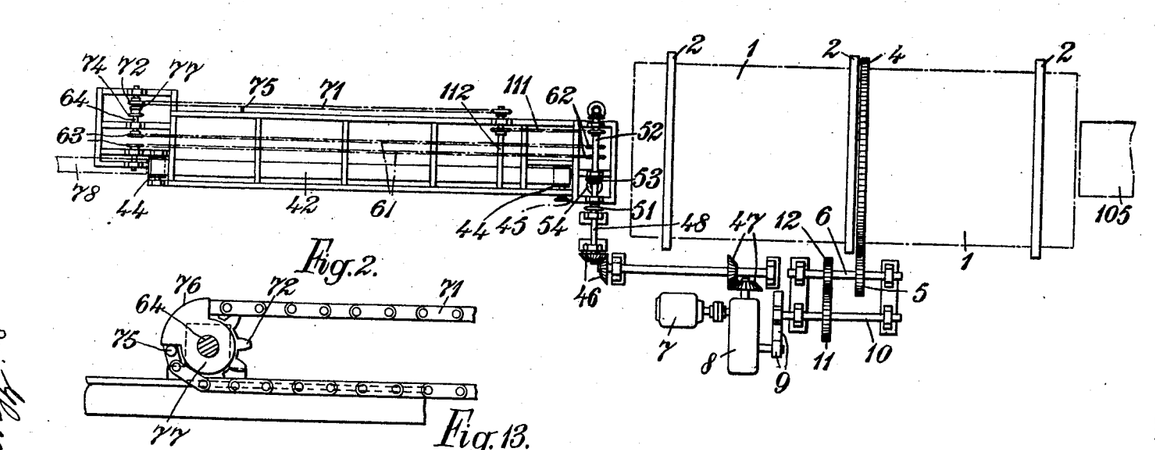
Figure 2 is a diagrammatic plan view of Figure 1 on a reduced scale.
Figure 13 is a detail view illustrating the means employed for restarting the ram.

The retorts may conveniently be disposed with their axes horizontal, as shown and the retorts may be provided in two concentric rings and be supported upon three longitudinally spaced rings 2, which latter are supported upon pairs of rollers 3, the centre pair of which are flanged as shown at 109 in Figure 1a to prevent longitudinal displacement of the retort assembly. The said rings have aligned openings through which the respective retort tubes may be passed and the arrangement is conveniently such that the individual retort tubes may be readily withdrawn axially from the rings when required, as for the purpose of repair or replacement. The centre ring 2 has associated with it a gear ring 4 which latter engages with a pinion 5 upon a shaft 6 which is driven by a motor 7 (which may be a constant speed electric motor) through a variable speed gear 8, Geneva drive 9, shaft 10, pinion 11 and pinion 12 carried on the shaft 6. By this mechanism the retort assembly is rotated in a step-by-step manner.

Figure 3:
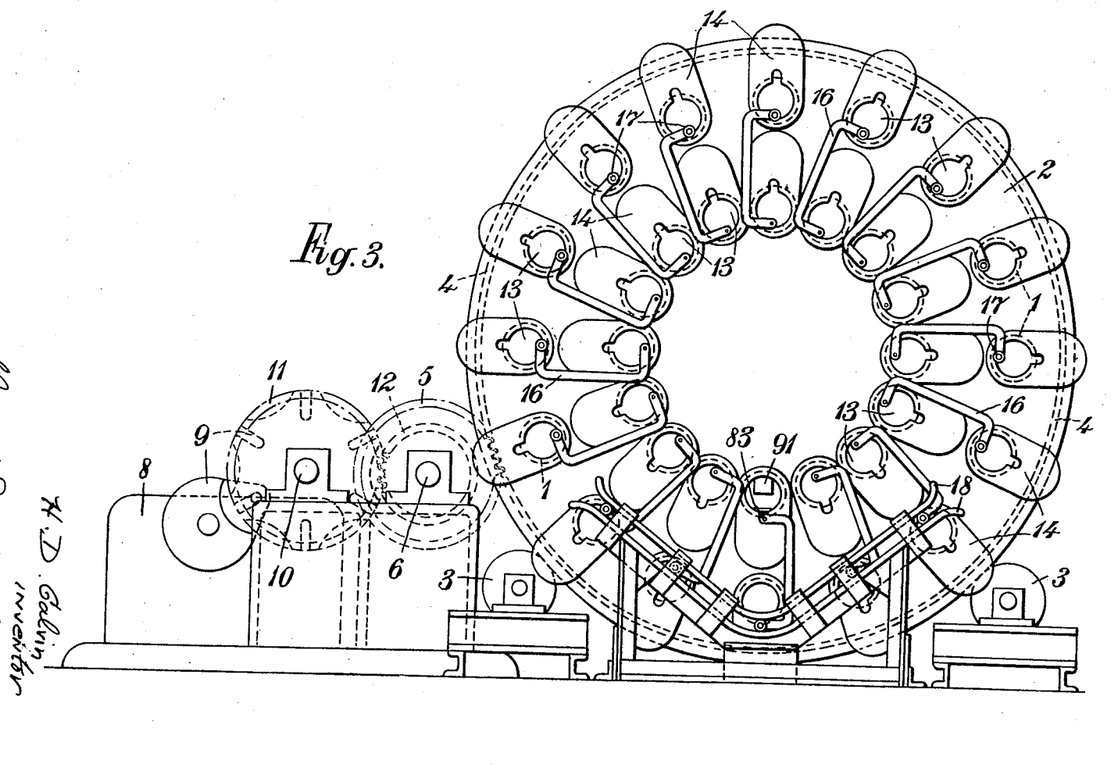
Figure 3 is an end view of Figure 1 looking on the unloading end.

Each retort is provided at each end with a door or other closure 13 (Figures 1a, 3 and 7) and conveniently these doors are of the sliding type and are guided for vertical movement in guide casings 14 and in order to ensure a fluid-tight engagement of the doors with respect to their guide casings each door may be made in two parts which are urged into contact with the opposite walls of the casing by springs 15 (Figure 7) secured between the door parts. The two parts of each door have peripheral flanges 110 arranged in overlapping relationship so that the parts are constrained to move as one.

There are an equal number of retort tubes in each ring thereof and the retort tubes in the two rings are disposed opposite each other so that the doors of the retorts of adjacent pairs thereof can be interconnected for simultaneous opening and closing movements by links 16 which latter at their outer ends may be provided with rollers 17 or other anti-friction devices adapted to engage ramps 18 provided at each end of the retort assembly.

The cans 104 are fed to the retort tubes at one end thereof and discharged at the opposite end and at the feed end of the retort assembly there is provided a distributor for the various fluid media.

This distributor (Figures 1a, 4, 5 and 6) comprises a fixed chamber 19 disposed with its longitudinal axis coaxial with the centre of the retort assembly and associated with the delivery end of this chamber there is a distributor disc 20 which is secured to the adjacent ring 2 by brackets 21 so that this distributor ring rotates with the retort assembly. The distributor is centred in position by a guide spindle 22 supported at one end in the fixed chamber 19 and at its other end by a bearing 23 carried by a web 24 secured at the centre of the said ring 2. The spindle 22 carries a disc 25 between which and the distributor disc there are provided springs 26 for urging the distributor disc into close contact with the end plate 27 of the distributor chamber, which plate is formed with arcuate slots 28, 29, 30 and 31 of varying length and functions as a controlling disc for controlling the supply of the various fluid media to the retort tubes through ports 38 in the distributor disc and pipes 32, which latter are connected between the distributor disc and the inlet ends of the retorts.

Figure 4:
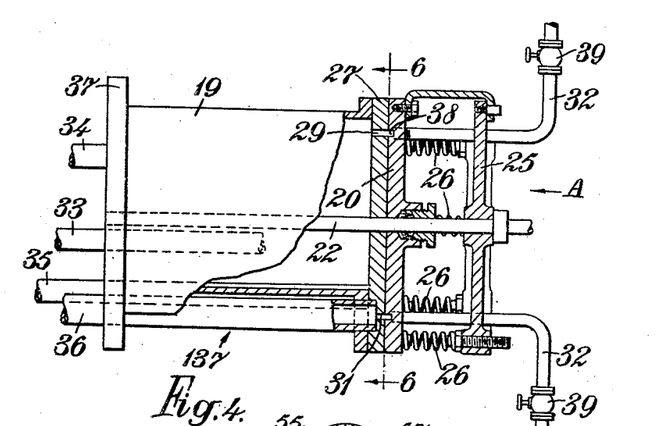
Figure 4 is an enlarged elevational view, partly in section, of the valve chest employed for controlling the supply of the various fluid media to the retorts, the section being taken on the line 4—4 of Figure 5.

The fluid media are conveyed from their supply sources along pipes 33, 34, 35 and 36 of which the pipe 34 terminates at the end plate 37 of the distributor chamber and discharges into the interior of the latter while the pipes 33 and 35 are extended through this chamber and terminate at the controlling disc 27 and communicate with the arcuate slots 28 and 30 respectively, the interior of the distributor chamber being in communication with the arcuate slot 29. The other pipe 36 also extends to the controlling disc 27 but is situated inside the distributor chamber and may be accommodated within a longitudinal channel 137 formed in the wall of said chamber. This pipe 36 communicates with the other arcuate slot 31.

The pipe 33 receives a supply of high pressure steam which is admitted to the pipes 32 during the time that the ports 38 in the distributor disc 20 are open to the arcuate slot 28.

The pipe 34 receives a supply of low pressure steam which is admitted to the pipes 32 during the time that the ports 38 in the distributing disc 20 are open to the arcuate slot 29.

The pipe 35 receives a supply of air which is admitted to the pipes 32 during the time that the ports 38 in the distributing disc 20 are open to the arcuate slot 30.

The pipe 36 receives a supply of water which is admitted to the pipes 32 during the time that the ports 38 in the distributing disc 20 are open to the arcuate slot 31.

Each of the pipes 32 is fitted with a valve 39 by which it is possible to isolate the pair of retort tubes supplied by one of these pipes from the pressure media and which will be necessary should it be required to remove a retort tube. Each pipe 32 supplies the fluid media to an associated pair of retort tubes through branches 40 and 41.

The retort assembly is rotated intermittently through the Geneva gear and associated mechanism previously referred to and provision is made for feeding a batch of cans of predetermined number into each retort tube of an associated pair at the time when each such pair is situated at the lowest part of the ramp 18 and have their doors fully open.

There are accordingly provided for co-operation with each retort tube of an associated pair thereof an endless band conveyor 42 and a ram 43 (Figures 1, 2 and 7 to 12), the ram corresponding to each conveyor being disposed alongside the latter.

Each conveyor is supported upon rollers 44 of which those adjacent the retort assembly are driven by chains 45 (Figure 1) which in turn are driven from the variable speed gear 8 through bevel gearing 46 and 47. The shaft 48 carrying one of the bevel wheels 46 has a sprocket 49 secured thereon and a chain 50 is passed around this sprocket and around a further sprocket 51 secured upon a transverse shaft 52 located at the top of the can feeding apparatus. The shaft 52 has secured thereto at each end a bevel wheel 53 and these wheels are arranged to mesh with bevel wheels 54 carried at the upper ends of two vertical shafts 55 (Figures 7 and 8) located one upon each side of the feeding apparatus.

Figure 7:
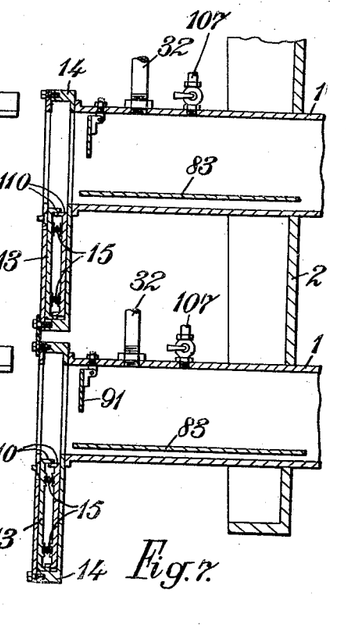
Figure 7 is an enlarged elevational view of the feed end of the loading apparatus.
Figure 7A:
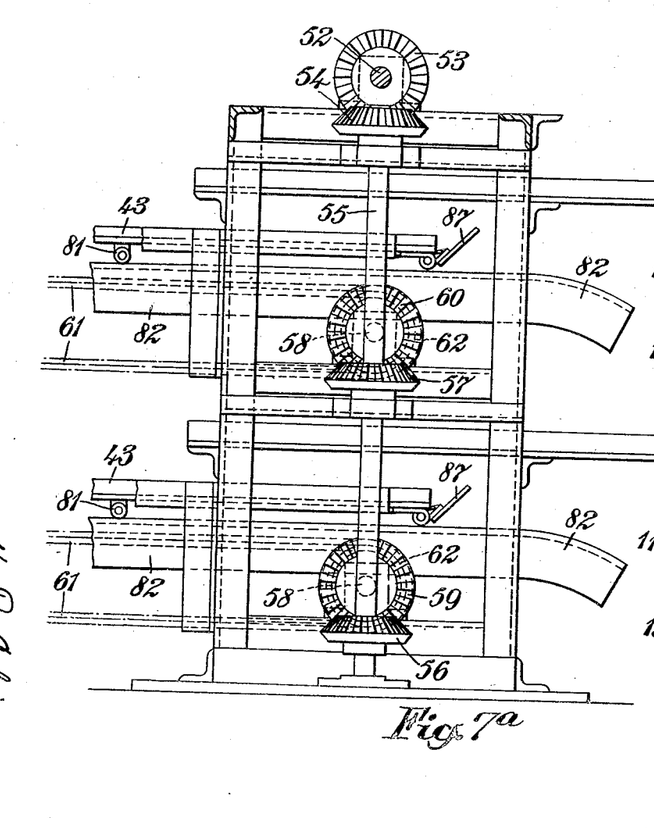
Figure 7a is an enlarged elevational view of the feed mechanism.
Figure 8:
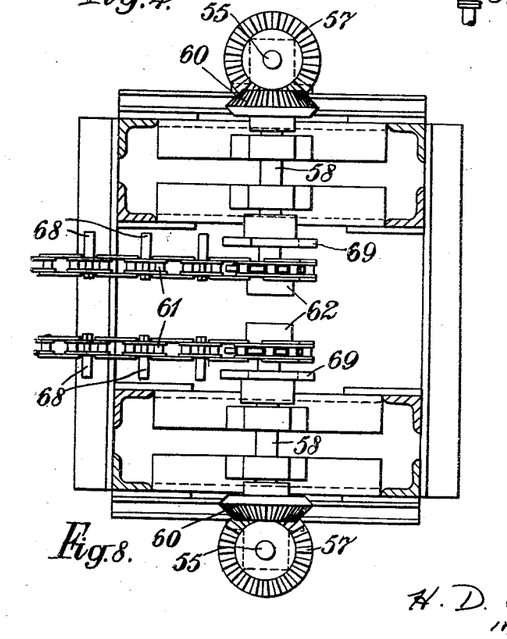

Each said vertical shaft 55 also has a bevel wheel 56 secured at its lower end and a third bevel wheel 57 secured intermediate the ends of the shaft. The transverse shaft 52 is driven by the chain 50 and this shaft rotates the vertical shafts 55 through the bevel gearing 53, 54, while the shafts 55 in turn rotate stub-shafts 58 (Figure 8) through the bevel wheels 56, 57 and further bevel wheels 59, 60 provided upon the stub-shafts and engaging with the said bevel wheels 56, 57 respectively.

Figure 9:
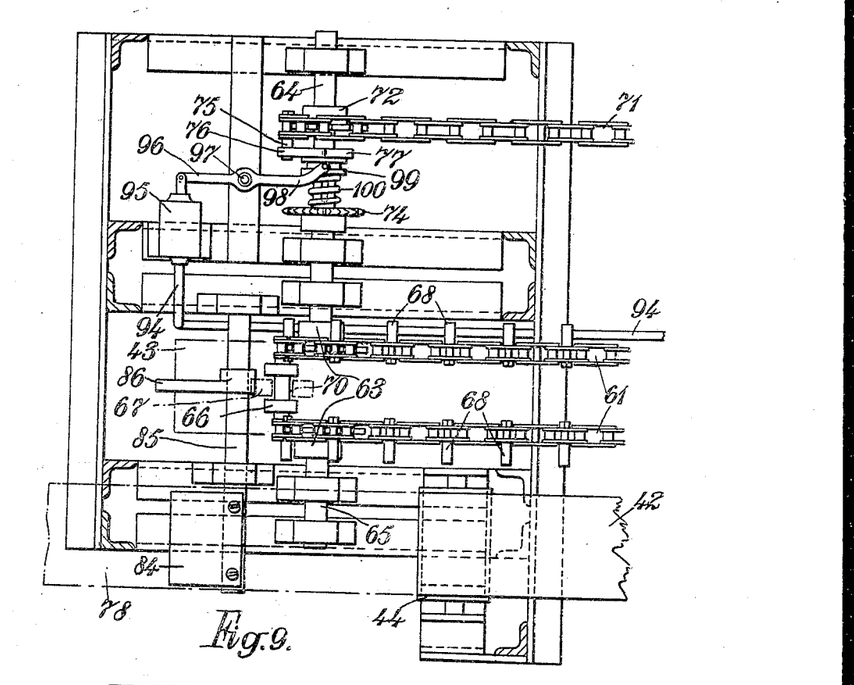
Figure 9 is an enlarged plan view of the receiving end of the loading apparatus.
Figure 10:
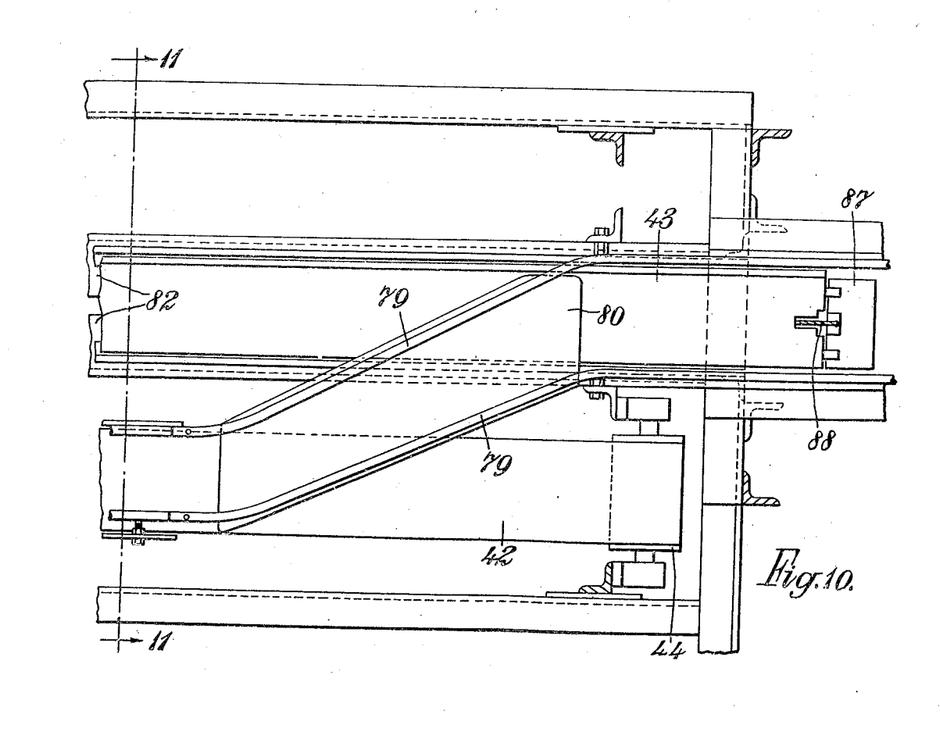
Figure 10 is an enlarged plan view of an intermediate part of the loading apparatus showing the means for transferring the cans from a feed conveyor to a ram.
Figure 11:
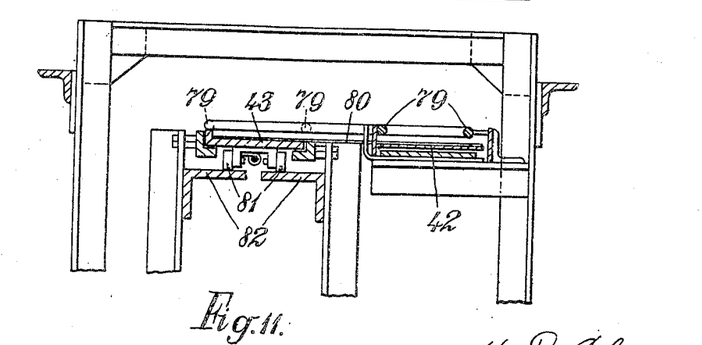
Figure 11 is a vertical sectional elevation on the line 11—11 of Figure 10.
Figure 12:
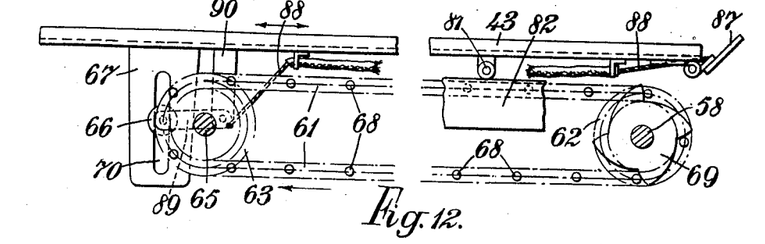
Figure 12 is an elevational view of the ram mechanism with the central portion broken away.

Each stub-shaft 58 carries a sprocket wheel 62 loosely mounted upon its respective shaft and these sprockets serve to support one end of endless chains 61, which, at their opposite ends, are supported upon further sprockets 63 which are fixed upon further stub-shafts 64 and 65 (Figure 9).

There are thus two pairs of superposed chains 61 corresponding one pair to each retort tube of an associated pair thereof and secured between each pair of chains is a roller 66 which engages within a vertical slot 70 formed in a plate 67 which depends from the end of the corresponding ram 43 remote from the inlet end of the retort assembly. The chains are provided with lateral pins 68 adapted to engage with star wheels 69, which latter are fixed upon the stub-shafts 58 and serve to drive the chains. As the chains move so will the associated rams be reciprocated due to the interengagement of the rollers 66 and slots 70 (see Figure 12).

In order to provide for intermittent movement of the chains 61 to produce corresponding intermittent movement of the rams it may be arranged that a number of the pins 68 are omitted from the chains so that upon the arrival of this pinless portion of the chains at the star wheels 69 the drive therefrom ceases. The arrangement is such that this drive will cease after the rams have made one complete reciprocatory movement and they are situated in their extreme outermost positions with respect to the retort assembly.

To initiate a further movement of these chains there may be provided a further chain 71 (Figures 2 and 9) mounted so as to be driven from the transverse shaft 52 (through the medium of an auxiliary chain 111 and countershaft 112) and passed around a sprocket wheel 72 secured to one of the stub-shafts 64, both of which stub-shafts are interconnected by a chain 73 (Figure 1) passed around sprockets 74 on the shafts. The arrangement will be such that after a predetermined interval in the cessation of movement of the chains 61 a pin 75 on the chain 71 will come into contact with a segment 76 on a disc 77 secured to the stub-shaft 64 carrying the sprocket 72 and thereby cause this stub-shaft and the chain 73 and sprocket 74 to be rotated a sufficient distance to move the pinless portion of the chains 61 past the star wheels 69 whereupon these wheels can operate to advance the chains 61 in order to complete a further reciprocation of the rams.

The endless conveyor 42 associated with each ram is continuously driven and receives a supply of cans from an inclined chute or guideway 78 (Figures 1 and 9) and provided along the sides of each conveyor are guides 79 (Figure 10) which, towards the delivery ends of the conveyors, follow oblique plates 80 which form a bridge between the conveyors and their corresponding rams and serve to transfer the cans from the conveyors to the rams.

Each ram is in the form of an elongated plate which is supported by rollers 81 for movement upon a track 82 (Figure 11) and each retort tube is provided with a similar track 83 (Figure 7) upon which the ram rollers move when the ram is introduced into a retort tube.

The particular machine illustrated is designed to introduce a predetermined number of cans or the like into an associated pair of retort tubes and simultaneously with the loading of these retort tubes with a fresh batch of cans to discharge from the tubes and cans already accommodated therein.

Each batch of cans required to be deposited upon a ram 43 are conveniently located upon the respective inclined chute or guide 78 (Figures 1 and 9) behind a plate 84 which is normally disposed in the path of the cans and is mounted upon a spindle 85 to which there is secured an arm 86 which is angularly disposed on the spindle with respect to the plate and normally lies in the path of the ram so that when, upon the return movement of the ram, the latter makes contact with the arm 86 the spindle 85 will be rotated an extent sufficient to raise the plate 84 into the position shown in Figures 1 and 9, in which position the plate is out of the path of the cans which are, therefore, free to move onto the respective conveyor 42.

For the purpose of isolating a fresh batch of cans on a ram from the batch of cans already within a retort tube and for permitting withdrawal of the ram from a retort tube such that the batch of cans thereon are left within the retort tube each ram is fitted at its forward end with a pivoted flap or plate 87 to which there is secured one end of a Bowden wire 88 (Figure 12), the other end of which is secured to a lever arm 89 secured between an arm 90 depending from the rear end of the ram and the roller 66. When a batch of cans is fed onto a ram the plate 87 is in a vertical position and remains in this position until the ram reaches the end of its forward movement through a retort tube so that this plate lies between the last can of the old batch thereof and the first can of the new batch. At the feed end of each retort tube there is fitted a pivoted plate 91 (Figure 7) which is free to be moved in one direction into a raised position by the action of a ram filled with cans striking this plate which remains in a raised position until the ram is fully inserted into the retort tube when the plate 91 is free to drop into its normal position in which the fresh batch of cans is retained within the retort tube when the ram is removed therefrom and at which time the plate 87 will be lowered into a horizontal position by the actuation of the Bowden wire 88.

It may be desired in the operation of the machine that the rams should not operate when a certain associated pair of the retort tubes arrives opposite the rams, as for example when a defect has been observed in one of these retort tubes or when it is desired to remove a retort tube for repair or renewal. One way of achieving this requirement is to provide the ring 2 at the inlet end of the retort assembly with a circular series of holes located one opposite each pair of associated retort tubes and providing a valve 92 connected by a pipe 93 with the compressed air supply pipe 35 and by another pipe 94 with a cylinder 95. This cylinder contains a piston (not shown) which is connected with one arm 96 of a double-armed lever pivoted at 97 and having its other arm 98 connected with a collar 99 which has a splined connection with the stub-shaft 64 carrying the segment 76 which latter is secured to the collar 99. The segment 76 is normally maintained in the path of the pin 75 on the ram starting chain 71 by the action of a spring 100. The supply of the fluid media to each retort tube is, as already described, capable of being controlled by a valve 39. When it is desired to cut off the supply of the fluid media to an associated pair of retort tubes the valves 39 corresponding to the fluid media supply pipes of these retort tubes are closed and a stud 101 (Figure 1) is secured within the hole in the said ring 2 opposite this particular pair of retort tubes. The valve 92 is provided with a spring 102 which operates so as normally to close the valve and the valve is provided with an abutment 103 disposed to lie within the path of the pin 101. Thus upon this pin arriving opposite the abutment the latter will be depressed to cause the valve 92 to be opened. This will result in the pneumatic device 95 being actuated to cause the segment 76 to be moved out of the way of the pin 75 on the ram starting chain 71 so that the rams will not be restarted until the next associated pair of retort tubes arrive opposite the rams at which time the pin 101 will have moved beyond the valve 92 so that the latter is closed and the segmental disc 76 will have been restored to its normal position.

In the operation of the apparatus and consider the position when the retort assembly has been arrested, by the operation of the Geneva drive 9, in a position in which an associated pair of retort tubes 1 are immediately opposite the rams 43 and contain a cooked batch of cans 104. In this position of the retort assembly the doors 13 at each end of the said associated pair of retorts will be fully open and the rams will be situated in their outermost positions with respect to the retort tube assembly in which position of the rams the flaps 84 will have been raised by the arms 86 having been actuated by contact with the ends of the rams. This is the position of the various parts of the apparatus as illustrated in the drawings, and in which position a new batch of cans will already be moving upon the conveyors 42 due to their being released by the plate 84.

The motor 7 is continuously operating and through the gearing 47, 46, and chains 45 produces continuous movement of the endless conveyors 42. As the cans travel towards the feed ends of the open retort tubes they will reach the bridge plates 89 and be transferred to their respective rams. At the moment when the advance can of each batch thereof upon the conveyors reaches its respective ram the pin 75 on the ram starting chain 71 will make contact with the segment 76 to cause rotation of the stubshaft 64 and consequently cause the ram feeding chains 61 to be advanced a distance sufficient to cause the star wheels 69 to drive the chains through their engagement with the pins 68. The rams will therefore be carried forwards towards the inlet ends of the pair of retort tubes and as the rams are advanced the cans will continue to be deposited upon the rams from the transfer plate 80.

Continued movement of the rams will cause them to enter the open retort tubes at their inlet ends and as they do so the cooked cans therein will be discharged from the opposite ends of the retort tubes where the discharged cans may be collected upon a table 105 or any other suitable collecting device. As each ram commences to move forwards the flap 87 at its forward end will be raised due to the actuation of the Bowden wire 88 as the roller 66 on the chains 61 moves upwardly within the vertical slot 70 in the plate 67 which depends from the ram. This flap 87 is maintained in its elevated position during the forward movement of its ram through the respective retort tube, but at the end of the forward movement of the ram the flap will be lowered, due to a further actuation of the Bowden wire, as the roller 66 moves downwardly in the slot 70 and the flap 87 will remain in its depressed position during the return movement of the ram, so that the ram is free to be withdrawn from under the cans which are accordingly left in the retort tube and are prevented from being withdrawn with the ram by the stop plate 91 which is restrained against pivotal movement in a direction towards the inlet end of its retort tube.

When each ram is fully withdrawn from its retort tube its propelling chains 61 will cease to be driven by the star wheels 69 due to the arrival at the latter of that portion of each said chain 61 from which pins 68 are omitted. The reciprocatory motion of the rams will thus be terminated until the starting chain 71 again initiates their operation.

When the rams have been fully removed from the retort tubes the Geneva drive 9 operates to rotate the retort assembly a further step in order to bring the next associated pair of retort tubes opposite the rams.

As the retort assembly rotates the doors of the retort tubes will be closed by the operation of the ramp 18 and the distributor disc 20 will be rotated.

During the time when the doors of a pair of associated retort tubes are open the ports 38 in the distributor disc corresponding to that pair of retorts are situated opposite a blank portion 106 of the end plate 27 of the distributor chamber 19 so that no fluid medium is delivered to the retort tubes. The moment the doors are closed the said ports 38 come opposite the arcuate slot 28 and during passage of the distributor disc past this slot the said pair of retort tubes will be supplied with high pressure steam which is followed by a supply of low pressure steam as the ports 38 pass the arcuate slot 29, then by compressed air as the ports pass the arcuate slot 30 and finally by cold water as the ports pass the arcuate slot 31, the filled retort tubes being rotated step-by-step past these various fluid supply stages as each associated pair of retort tubes are loaded with a fresh batch of cans.

When the high pressure steam is introduced into the retort tubes the cans are raised quickly to a cooking temperature as the pressure of the steam builds up within the retort tubes and the cooking temperature is maintained by the supply of low pressure steam which is admitted when the high pressure steam has reached a pressure in the retort tubes corresponding to, or slightly less than, the pressure of the low pressure steam.

The arrangement of the elongated arcuate slot 29 supplying the low pressure steam is such that a plurality of associated pairs of retort tubes receive a supply of this steam simultaneously so that adjacent pairs of the retort tubes will be virtually interconnected during this period of the cycle and are therefore heated uniformly so that by providing a suitable thermostat control for the main low pressure steam supply a constant temperature in the retort tubes can be maintained.

Each retort tube is fitted with a steam breather valve 107 and with a further valve 108 adapted to open at a predetermined pressure which is slightly lower than that required to scavenge each retort tube when the latter receives a supply of compressed air from the arcuate slot 30, the compressed air being supplied at a pressure which is slightly higher than the pressure of the high pressure steam so that the pressure in the retorts is increased to an extent sufficient to release their valves 108 and so permit scavenging of the steam.

The water or other cooling medium is introduced into the scavenged retort at a pressure slightly in excess of the pressure then existing in the retort tubes so that the remainder of the compressed air therein will be ejected through the valves 108. The water may be supplied to the retort tubes by a suitable pump and provision is made for removing the water from the retort tubes after the same have been flooded to an extent sufficient to cool the cans therein. For instance, provision may be made to reverse the water supply pump at a predetermined time so that the water is removed by suction.

It will be appreciated that by means of the distributor chamber 19 and the control disc 27 the cycle, extent, and timing of the fluid supplies to the various retorts will be regulated and by making the control disc and/or distributor chamber readily interchangeable these various factors can be altered to suit any given circumstances.

The arcuate slots in the control disc will be separated from one another by blank spaces giving idle periods and such idle periods may be varied in length by varying the speed of rotation of the distributing disc or by interchange of the control disc.

It will be understood that this particular sequence is only given by way of illustration and the nature of the media supplied, the order and timing of the supplies and the extent of the same may be readily varied to suit any given requirements.

Usually it will be convenient to arrange each can loading station so that a plurality of retorts may be loaded simultaneously while the same number will be discharged simultaneously at the discharging station, but here again the precise arrangement adopted will depend upon any particular requirements. Instead of employing two concentric rings of retort tubes the number of rings may be increased (the rams and can conveyor mechanism being correspondingly increased) or only a single ring of retort tubes may be provided in which case the ram and conveyor mechanism is correspondingly modified.

It will be readily appreciated that an important advantage of the apparatus above described as compared with existing large capacity apparatus lies in the fact that if any trouble arises in one retort that retort may be immediately isolated by means of suitable control valves so that it may be discharged or repaired or otherwise attended to without in any way interfering with the continued operation of the remaining retorts so that in this way the total capacity of the apparatus is not seriously diminished and any damage to cans is limited to a very small amount.

A further important advantage lies in the fact than the apparatus is adaptable for the handling of cans, bottles or the like of different shapes and sizes.

The invention extends broadly to the employment of a plurality of relatively small diameter retorts arranged to be moved in succession past loading and unloading stations with means for supplying any required media to the retorts during such movement and the invention, therefore, is not to be limited to the foregoing details of construction which are given purely by way of example and one may vary the size and shape of the retorts, the method of mounting the same for the prescribed movements, the means adopted for opening and closing the retorts and other details in connection with the supply of fluid media to the retorts depending upon the nature of the operations to be performed or any practical requirements to be fulfilled.

I claim:

1. Apparatus for heating and cooking foodstuffs in containers comprising in combination, a rotatable structure, a plurality of retort tubes carried by said structure and arranged in a circle about the axis of rotation thereof with their longitudinal axes substantially parallel with the said axis, the retort tubes being rotatable with the said structure, means for rotating said structure, means for feeding containers positively to each retort tube when the same is brought into a position opposite said feeding means, the latter including a reciprocable ram movable into and out of each retort tube and adapted to accommodate a batch of containers in alignment longitudinally thereof, and fluid distributing means connected to all the retort tubes.

2. Apparatus for heating and cooking foodstuffs in containers comprising in combination a rotatable structure, a plurality of retort tubes carried by the said structure and arranged in a circle about the axis of rotation thereof with their longitudinal axes substantially parallel with said axis, the retort tubes being rotatable with the structure, means for rotating the structure in a step-by-step manner, closure means at each end of each retort tube, means for feeding containers to each retort tube when a retort tube is aligned opposite the feeding means, the said feeding means comprising a ram reciprocable in the direction of the axis of the said aligned retort tube, and means for supplying a heating fluid to the retort tubes.

3. Apparatus for heating and cooking foodstuffs in containers comprising in combination, a plurality of retort tubes, a rotatable supporting structure for the retort tubes, the said tubes being disposed in a circle concentric with the axis of rotation of the structure with their longitudinal axes substantially parallel with said axis and being separately removable from said structure, means for rotating the structure and means for positively feeding containers to the individual retort tubes when they are brought into alignment with the said feeding means.

4. Apparatus for heating and cooking foodstuffs in containers comprising in combination, a rotatable structure, a plurality of retort tubes disposed about the axis of rotation of the said structure with their longitudinal axes substantially parallel with said axis, the retort tubes being rotatable with the structure and each retort tube being separately removable from the structure, means for rotating the structure in a step-by-step manner, means for positively feeding containers to each retort tube when the same is brought into alignment with the said feeding means and means rendering the feeding means inoperative at will while permitting the rotational movement of the structure to continue.

5. Apparatus according to claim 4 comprising also a fluid distributing means connected to all the retort tubes.

6. Apparatus according to claim 4 comprising also fluid distributing means connected to all the retort tubes, said distributing means including a chamber disposed at the feed end of the retort assembly and coaxial with the latter.

7. Apparatus for heating and cooking foodstuffs in containers comprising in combination, a rotatable structure, a plurality of elongated retort tubes disposed about the axis of rotation of the structure with their longitudinal axes substantially parallel with said axis, means for rotating the structure in a step by step manner, closure means at each end of each retort tube and means for positively feeding a batch of containers into each retort tube when a retort tube is aligned opposite the feeding means, the said feeding means comprising a ram movable to enter a retort tube when the latter is disposed opposite the ram and adapted to extend the full length of the tube, means for delivering a batch of containers to the ram when the same is disposed outside the retort tube, and means at the inlet end of each retort tube adapted to prevent removal of the containers with the ram as the latter is withdrawn from a retort tube.

HERBERT DAN GALVIN.